US008696844B2

(12) United States Patent
MacLachlan

(10) Patent No.: US 8,696,844 B2
(45) Date of Patent: Apr. 15, 2014

(54) METHOD OF ADHESIVE BONDING AND VEHICLE GLAZING CREATED THEREBY

(75) Inventor: Julia B. MacLachlan, Toledo, OH (US)

(73) Assignee: Pilkington Group Limited, St. Helens (GB)

( * ) Notice: Subject to any disclaimer, the term of this patent is extended or adjusted under 35 U.S.C. 154(b) by 291 days.

(21) Appl. No.: 13/138,831

(22) PCT Filed: Apr. 21, 2010

(86) PCT No.: PCT/US2010/001179
§ 371 (c)(1),
(2), (4) Date: Oct. 6, 2011

(87) PCT Pub. No.: WO2010/123554
PCT Pub. Date: Oct. 28, 2010

(65) Prior Publication Data
US 2012/0028053 A1    Feb. 2, 2012

Related U.S. Application Data

(60) Provisional application No. 61/171,876, filed on Apr. 23, 2009.

(51) Int. Cl.
C03C 17/30 (2006.01)
C03C 27/04 (2006.01)
B60J 10/02 (2006.01)

(52) U.S. Cl.
USPC .............. 156/108; 156/331.4; 156/331.7; 428/334; 428/335; 428/336; 428/425.6; 428/429; 428/441; 428/442

(58) Field of Classification Search
USPC ............ 156/108, 331.4, 331.7; 428/334, 335, 428/336, 425.6, 441, 442, 429
See application file for complete search history.

(56) References Cited

U.S. PATENT DOCUMENTS

| 3,707,521 | A | 12/1972 | de Santis |
| 5,852,137 | A | 12/1998 | Hsieh et al. |
| 6,001,214 | A | 12/1999 | Hsieh et al. |
| 6,015,475 | A | 1/2000 | Hsieh et al. |
| 7,332,225 | B2 | 2/2008 | Lewno |
| 7,955,702 | B2 | 6/2011 | Schwoeppe et al. |
| 2008/0268261 | A1* | 10/2008 | Schwoeppe et al. .......... 428/432 |
| 2011/0220269 | A1 | 9/2011 | Schwoeppe et al. |

FOREIGN PATENT DOCUMENTS

EP  0 173 907 A1  3/1986
EP  0 767 149 A2  4/1997

* cited by examiner

Primary Examiner — D. S. Nakarani
(74) Attorney, Agent, or Firm — Marshall & Melhorn, LLC

(57) ABSTRACT

A method is provided of adhesively bonding an elastomeric member to a glass substrate in such a way as to accelerate the building of the strength of such bond and to a vehicle glazing having such an elastomeric member bonded to the glass substrate. This accelerated bonding process is accomplished by mixing a nucleophilic and/or electrophilic catalyst with a beneficial amount of an adhesion promoting primer applying such mixture to a peripheral portion of the glass substrate and exposing same to ambient air. By accelerating the building of the subject bond strength, the rate of "creep" is significantly reduced.

13 Claims, 1 Drawing Sheet

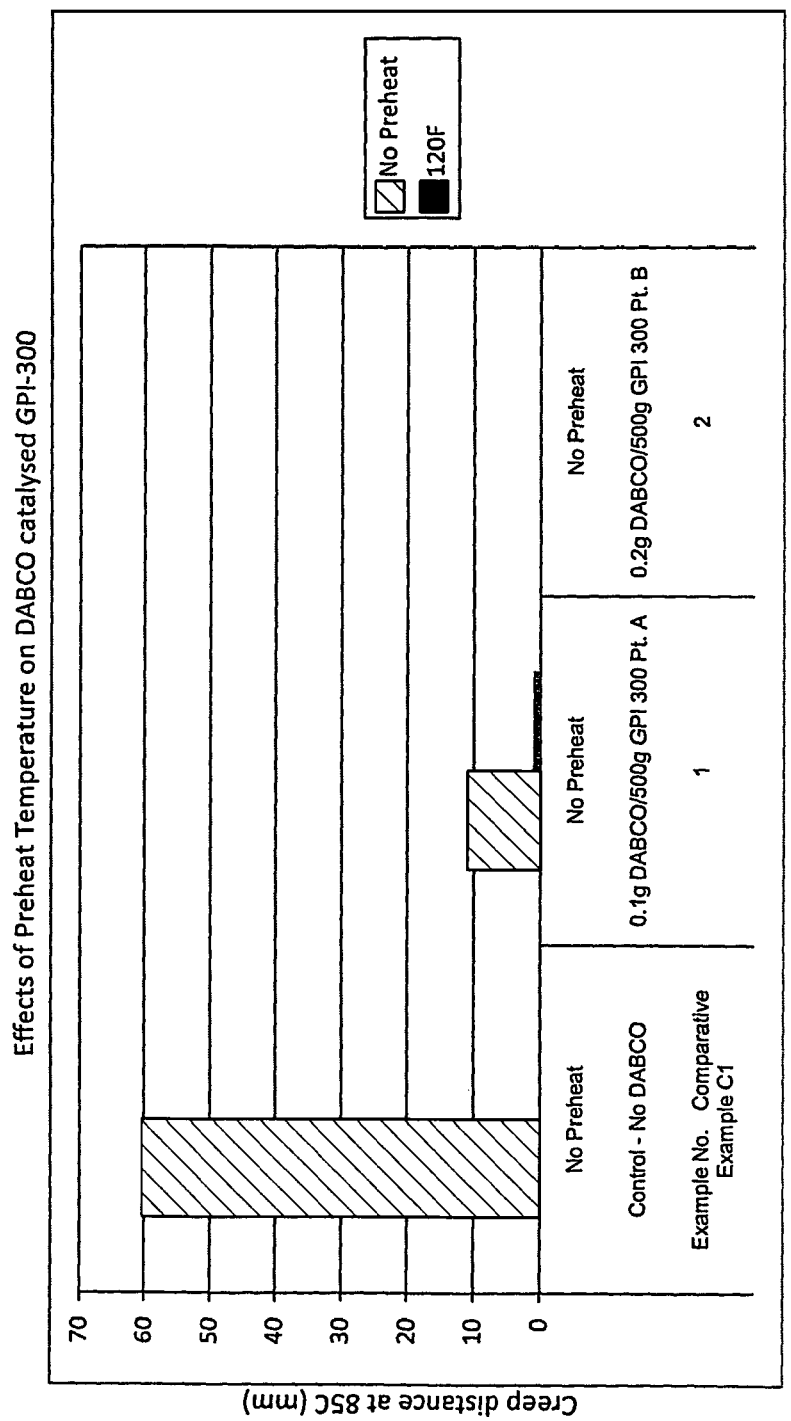

METHOD OF ADHESIVE BONDING AND VEHICLE GLAZING CREATED THEREBY

RELATED APPLICATIONS

This application, which is a national phase filing under 35 USC 371 of PCT international application No. PCT/US2010/001179 filed Apr. 21, 2010, pending as of the filing of the present application, claims the benefit of and priority to provisional application No. 61/171,876 filed Apr. 23, 2009, the contents of which are hereby incorporated by reference.

BACKGROUND

The present invention relates to a method of adhesively bonding an elastomeric member to a glass substrate and to a vehicle glazing created thereby.

For some years it has been the practice to produce so-called modular window assemblies which are installed as a unit in an opening in a vehicle body. Such modular window assemblies, typically, have a polymeric frame or gasket molded onto, or otherwise bonded onto, a peripheral portion of a glass vehicle window. Due to the known difficulty of obtaining a strong bond between polymeric materials and glass, it is standard practice to, prior to molding of the polymeric frame or gasket, treat the peripheral portion of the glass window by applying an adhesion-promoting primer. Notwithstanding this additional step, it is known by those skilled in making modular window assemblies that it may take many hours, to several days, for the bond between the polymeric member and glass to reach its full strength. Prior to reaching maximum bond strength, the polymeric frame or gasket may be dislocated from its intended position by relatively minor contact with, for example, product packaging or performance of other operations such as installing a bulb seal, or simply by its own weight under the pull of gravity. This effect commonly is known as "creep."

Due to modern manufacturing practices, where a modular window assembly may be delivered from the window manufacturer's facility to the vehicle manufacturer's facility within hours of its being made, it is possible that the previously described bond strength between polymeric material and glass may not have reached its maximum, thus raising the potential for dislocation or "creep" of the polymeric frame or gasket. It would, therefore, be desirable to decrease the time needed for the polymeric material/glass bond to reach, if not its maximum strength, at least sufficient strength to make significant dislocation or "creep" much less likely.

SUMMARY OF THE INVENTION

The present invention relates to a method of accelerating the building of the strength of the bond between an elastomeric member, such as a frame, gasket or the like, and a glass substrate, preferably at least a peripheral portion of such substrate. In a preferred application, the glass substrate is a vehicle window, and the frame, gasket, etc., is bonded to the window to form a modular vehicle glazing.

Typically, it is necessary to utilize an adhesion-promoting primer containing, e.g. a thermoplastic resin, an organosilane-based compound, and an isocyanate-containing compound, to effectively bond a polymeric material to a glass substrate. The time for such primers to achieve a significant amount of cohesive strength (herein referred to as "cure time") is, generally, >24 hours where such curing takes place in ambient air only and there is no addition of heat to accelerate the curing of the primer. It is frequently desirable to have a shorter cure time than more than 24 hours, without the need for additional process steps, such as heating.

The present invention achieves accelerated curing time of the primer, as well as enhanced cohesive strength of the primer with only exposure to ambient air. This accelerated curing time results from mixing a nucleophilic base catalyst with the primer compound, and applying a layer of such mixture to at least one major surface of the glass sheet at a thickness in a range of 0.1 mils (2 microns) to 1.5 mils (40 microns). It has been found that best results are achieved when the amount of catalyst mixed with the primer is in the range of 0.01-0.5 weight %. Creep rate, as a result of the decreased cure time of the catalyzed primer of the invention, is reduced by ≥50% over similar non-catalyzed primers. Once the glass substrate has been prepared as described, the frame, gasket, or the like can be molded onto the glass substrate by a known method, preferably injection molding or reaction injection molding to form a modular vehicle glazing.

BRIEF DESCRIPTION OF THE DRAWING

The FIGURE is a graph of the Effects of Preheat Temperature on DABCO catalysed GPI-300.

DETAILED DESCRIPTION OF THE INVENTION

The present invention relates to a method of bonding an elastomeric member to a glass substrate. More specifically, the invention relates to a method of accelerating the increase in strength of the bond between an elastomeric member and a glass substrate and to the creation of a modular vehicle glazing formed thereby.

It is well known to apply an adhesion-promoting primer, for example a primer containing a thermoplastic resin, an organosilane compound and an isocyanate compound, to a peripheral portion of a glass substrate, preferably a vehicle window, prior to molding or otherwise bonding a frame, a gasket or the like to the vehicle window to form a modular window assembly. While such known primers form an acceptably strong bond between the elastomeric material and the glass over time, this time period can be substantial, and during such time, the elastomeric member may be moved from its initial, desired location, thus causing the window assembly to be unusable by the end customer, typically a vehicle manufacturer.

It has been discovered that this deficiency can be minimized by mixing a nucleophilic base catalyst with such known primers in certain proportions. As will be discussed in more detail herein, other catalytic materials which might be thought by one skilled in the art of making modular window assemblies to have a similar beneficial effect seem to show no appreciable effect, beneficial or otherwise. When a primer/catalyst mixture in accordance with the invention is applied to a glass substrate at normal thicknesses, typically in the range of 0.1 mils (2 microns) to 1.5 mils (40 microns), cure time is greatly reduced, and "creep," as previously described herein, is likewise greatly reduced. While not wishing to be bound by any theory, it is believed that the foregoing result is due to the discovery that the rate limiting step in the chemical reaction of the primer/catalyst mixture is the formation of a polymeric network within the isocyanate compound, which results in the cohesive strength build of the primer. Preferably, the primer/catalyst mixture is cured by exposure to ambient air only. It is within the scope of the invention, however, to heat the primer/catalyst mixture or the glass substrate to a temperature on the order of 120° F. or greater. With ambient air curing only, testing of the primer/catalyst mixture of the invention has shown that creep rate is reduced by ≥50%, and preferably ≥80%, over similar non-catalyzed primers.

While any suitable primer including a thermoplastic resin, an organosilane-based compound and an isocyanate-containing compound may be used in connection with the invention, it has been found to be advantageous to utilize a primer having at least two isocyanate groups in accordance with the invention. A most particularly preferred isocyanate compound is methylene diphenyl diisocyanate (MDI). Exemplary thermoplastic resins useful in connection with the invention including polyesters, chlorinated polyolefins, and more generally, resins having some degree of polarity.

With regard to the catalyst, a nucleophilic-base catalyst has been found to be advantageous in connection with the present invention. Exemplary nucleophilic-base catalysts include 1,4-diazo-bicyclo[2.2.2]octane, N-methyl morpholine, tetramethyl butane diamine and bis(2-dimethyl aminoethyl) ether, with 1,4-diazo-bicyclo[2.2.2]octane being preferred.

It is within the scope of the invention to mix both a nucleophilic-base catalyst and an electrophilic catalyst with an organosilane-based primer to achieve accelerated bonding of an elastomeric member to a glass substrate. Exemplary nucleophilic-base catalysts are those previously noted herein, while exemplary electrophilic catalysts include dibutyltin dilaurate and tin octoate.

The elastomeric frame, gasket or the like, to be bonded to the periphery of the glass substrate can be a thermoset or a thermoplastic material such as a poly-urethane material, polyvinylchloride or other suitable material.

The elastomeric frame, gasket, or the like, if molded onto the glass substrate, can be formed by any suitable molding method, such as reaction injection molding or injection molding.

EXAMPLES

As previously mentioned, by reducing the cure time/accelerating the rate of bond build strength, the amount of "creep" is substantially reduced by the present invention. Various tests were performed to quantify the amount by which creep is reduced by the present invention.

The test coupons were prepared by utilizing 1 in.×6 in. pieces of EZ-KOOL® solar control glass commercially available from Pilkington North America, Inc., to which Johnson Mathey 2TM050 ceramic enamel had previously been applied. Certain examples designated as C1-C7 are comparative examples, and are not within the scope of the invention. Examples 1-7 test the effects of varying amounts of the catalyst 1,4-diazobicyclo[2.2.2]octane ("DABCO") mixed with GPI-300 Part A urethane primer, and such mixtures applied on the glass at varying thicknesses. Further, certain samples were exposed to air only, and some were heated to accelerate curing. The results of these tests are shown in tabular and graphical form as Tables 1-3 and the FIGURE.

As can be seen from the results set forth in Tables 1-3 and the FIGURE, the presence of DABCO in any amount has some degree of beneficial effect in reducing creep, while the use of dibutyltin dilaurate (DBTDL), another potential catalytic material, had little or no effect in reducing creep. Generally, the addition of DABCO in amounts of 0.05 g-0.2 g are preferred. Stated another way, the addition of 0.01-0.5 weight % catalyst is preferred. Testing reflected in the tables and graph of the FIGURE utilized 0.10 and 0.20 weight % DABCO.

Utilization of nucleophilic-base catalysts regularly reduced creep by >50% and in some instances, by >80%. This is highly significant in allowing manufacture of modular window assemblies which can be installed in vehicles on a vehicle assembly line within a short time after the modular window assembly is made with minimal risk of failure of the bond between the elastomeric member and the glass window onto which the elastomeric member has been molded.

TABLE 1

| Comparative Example/ Example No. | Primer | Thickness | Creep (mm) |
|---|---|---|---|
| C1 | Control-No DABCO | Thin (<0.3 mils) | 37 |
| 1 | 0.1 g DABCO/500 g GPI 300 Pt. A | Thin | 0 |
| 2 | 0.2 g DABCO/500 g GPI 300 Pt. A | Thin | 0 |
| C2 | Control-No DABCO | Medium (>0.3-0.7 mils) | 52 |
| 3 | 0.1 g DABCO/500 g GPI 300 Pt. A | Medium | 0 |
| 4 | 0.2 g DABCO/500 g GPI 300 Pt. A | Medium | 0 |
| C3 | Control-No DABCO | Thick (>0.7 mils-≤1.5 mils) | 31 |
| 5 | 0.1 g DABCO/500 g GPI 300 Pt. A | Thick | 0 |
| 6 | 0.2 g DABCO/500 g GPI 300 Pt. A | Thick | 0 |

TABLE 2

| Comparative Example C4 Control—unadulterated | |
|---|---|
| Sample No. | Creep (MM) |
| 1 | 5 |
| 2 | 6 |
| 3 | 4 |
| 4 | 20 |
| Average | 9 |
| St. Dev. | 8 |

| Comparative Example C5 DBTDL-0.5 g added | |
|---|---|
| Sample No. | Creep (MM) |
| 1 | 60 |
| 2 | 11 |
| 3 | 60 |
| 4 | 40 |
| 5 | 11 |
| 6 | 60 |
| 7 | 60 |
| 8 | 10 |
| Average | 39 |
| St. Dev. | 24 |

| Example 7 DABCO-0.5 g added | |
|---|---|
| Sample No. | Creep (MM) |
| 1 | 0 |
| 2 | 0 |
| 3 | 0 |
| 4 | 0 |
| 5 | 0 |
| 6 | 0 |
| 7 | 0 |
| 8 | 0 |
| Average | 0 |
| St. Dev. | 0 |

TABLE 2-continued

Key
Fail = 60 (bold)
Thin primer ( <0.3 mils), then 15 minute air dry
Samples cured to 180° F. "short cure" using IR heat, then mold.
Cooled for 30 minutes
Creep tested @ 85° C. for 10 minutes

TABLE 3

Comparative
Example C6
Control—unadulterated

| Sample No. | Creep (MM) |
|---|---|
| 1 | 60 |
| 2 | 60 |
| 3 | 60 |
| 4 | 60 |
| Average | 60 |
| St. Dev. | 0 |

Comparative
Example C7
DBTDL-200 pm added

| Sample No. | Creep (MM) |
|---|---|
| 1 | None Tested |
| 2 | None Tested |
| 3 | None Tested |
| 4 | None Tested |
| 5 | None Tested |
| 6 | None Tested |
| 7 | None Tested |
| 8 | None Tested |
| Average | N/A |
| St. Dev. | N/A |

Example 8
DABCO-0.2 g added

| Sample No. | Creep (MM) |
|---|---|
| 1 | 0 |
| 2 | 0 |
| 3 | 0 |
| 4 | 0 |
| 5 | 0 |
| 6 | 0 |
| 7 | 0 |
| 8 | 0 |
| Average | 0 |
| St. Dev. | 0 |

Thin primer (0.3 mils), then 15 minutes air dry
Samples cured to 180° F. "short cure" using IR heat, then mold.
Cooled for 30 minutes
Creep tested @ 85° C. for 10 minutes Those skilled in the art will appreciate that changes and modifications can be made to the invention in light of the preceding description. It is, therefore, to be understood that within the scope of the appended claims, the invention may be practiced otherwise than as specifically described.

What is claimed is:

1. A method of accelerating the bonding of an elastomeric member to a glass substrate comprising:
   providing a glass substrate having at least one major surface;
   providing an adhesion-promoting primer comprising a thermoplastic resin, an organosilane compound and an isocyanate compound;
   mixing a nucleophilic-base catalyst comprising 1,4-diazobicyclo [2.2.2] octane with the primer;
   applying the mixture of the primer and the nucleophilic-base catalyst to at least a portion of the major surface of the glass substrate; and
   disposing the elastomeric member onto the substrate in the area to which the mixture has been applied, thereby bonding the elastomeric member to the glass substrate, wherein the creep rate of the adhered elastomeric member is reduced by ≥50%.

2. The method defined in claim 1, wherein the amount of nucleophilic-base catalyst mixed with the primer is in the range of 0.01 wt. %-0.5 wt. %.

3. The method defined in claim 1, wherein the mixture of the primer and the nucleophilic-base catalyst is applied to the major surface of the glass substrate at a thickness in the range of 0.1 mils to 1.5 mils.

4. The method defined in claim 1, wherein the glass substrate is a vehicle window.

5. The method defined in claim 1, wherein the isocyanate compound comprises methylene diphenyl diisocyanate.

6. The method defined in claim 1, wherein the elastomeric member is a gasket formed by one of reaction injection molding or injection molding.

7. The method defined in claim 6, wherein the gasket comprises a thermoset material.

8. The method defined in claim 6, wherein the gasket comprises a thermoplastic material.

9. The method defined in claim 6, wherein the gasket comprises a two-part polyurethane material.

10. The method defined in claim 6, wherein the gasket comprises polyvinylchloride.

11. The method defined in claim 6, wherein the mixture of the primer and the nucleophilic-base catalyst is heated to a temperature >120° F.

12. A method of accelerating the bonding of an elastomeric member to a glass substrate comprising:
   providing a glass substrate having at least one major surface;
   providing an adhesion-promoting primer comprising a thermoplastic resin, an organosilane compound and an isocyanate compound;
   mixing a nucleophilic-base catalyst with the primer;
   applying the mixture of the primer and the nucleophilic-base catalyst to at least a portion of the major surface of the glass substrate; and
   disposing the elastomeric member onto the substrate in the area to which the mixture has been applied, thereby bonding the elastomeric member to the glass substrate, wherein the creep rate of the adhered elastomeric member is reduced by ≥50%, and further wherein the elastomeric member is a gasket formed by one of reaction injection molding or injection molding.

13. A method of accelerating the bonding of an elastomeric member to a glass substrate comprising:
   providing a glass substrate having at least one major surface;
   providing an adhesion-promoting primer comprising a thermoplastic resin, an organosilane compound and an isocyanate compound;
   mixing a nucleophilic-base catalyst with the primer;
   applying the mixture of the primer and the nucleophilic-base catalyst to at least a portion of the major surface of the glass substrate;
   disposing the elastomeric member onto the area to which the mixture has been applied; and
   heating the mixture of the primer and the nucleophilic-base catalyst to a temperature >120° F., thereby bonding the elastomeric member to the glass substrate, wherein the creep rate of the adhered elastomeric member is reduced by ≥50%.

\* \* \* \* \*